March 6, 1956 W R. FISHER 2,737,425
BEARING LINER
Filed March 27, 1953
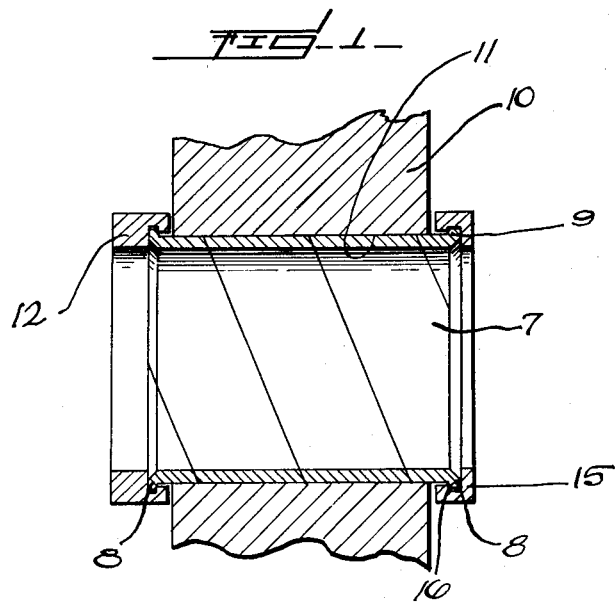
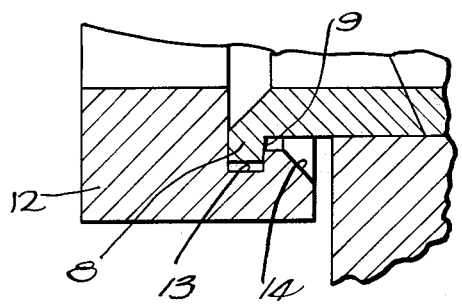
INVENTOR.
W. REUEN FISHER.
BY
ATTORNEY.

2,737,425

BEARING LINER

W Reuen Fisher, North Branch, Mich.

Application March 27, 1953, Serial No. 345,148

2 Claims. (Cl. 308—237)

My invention relates to a new and useful improvement in a bearing liner adapted for use as a bearing for rotating bodies such as shafts and the like, and adapted for mounting in a suitable support, having an opening formed therethrough of a determined diameter. The bearing may be mounted in a jig-plate or other suitable support, and it may be used as a guide for guiding drills, reamers, taps and so forth toward the work piece, or as a bearing for the rotating body.

It is an object of the present invention to provide a liner of this class which will be simple in structure, economical of manufacture, durable, highly efficient in use, and easily and quickly mounted in position on a support and removed therefrom.

It is another object of the present invention to provide a bearing liner formed from a coiled flat strip of hardened, wear-resisting, resilient material, and having on its opposite ends a radially outwardly projecting flange.

Another object of the invention is the provision of a coiled liner of this type having a pair of locking rings one positioned at each end for locking the liner in position on the support.

Other objects will appear hereinafter.

It is recognized that various modifications and changes may be made in the detail of structure illustrated without departing from the invention, and it is intended that the present disclosure shall be considered to be but the preferred embodiment.

Forming a part of this application are drawings in which,

Fig. 1 is a longitudinal, central, sectional view through the invention showing it mounted in position for use, Fig. 2 is an enlarged fragmentary sectional view illustrating the construction of the locking ring.

The liner consists of a coil 7 formed from flat resilient metal and wound into a coil and hardened. Extending outwardly from the periphery of this coil at each end is a radial flange 8, one face 9 of which is slightly tapered. The liner may be mounted in a suitable supporting body 10, having an opening 11 formed therethrough of a predetermined diameter. The coil to be inserted into this opening is normally of larger diameter than the opening, and when it is desired to insert the coil in the opening, it is torqued to a smaller diameter. While torqued to this smaller diameter, the coil is inserted through the opening and the torque pressure then released. The coil will then spring outwardly to tight engagement with the inner surface of the bore 11.

A locking ring 12 is provided with a groove or channel 13. The end of this locking ring outwardly from the groove 13 is provided with a beveled surface 14. The construction in such that the ring may, by being forced axially onto the coil, move thereon until the flange 8 snaps into the groove 13.

On the opposite end of the coil is a ring 15 having a groove or channel 16 therein adapted for reception of the flange 8. In order to place the ring 15 on the coil, the coil would be torqued to a small enough diameter to permit the ring to slip over the end so that when the torque on the coil is released, the flange will engage in the groove or channel 16.

When the liner is mounted as shown in Fig. 1, it may be used as a bearing or as a guide bushing. The collars serve to retain the liner on the retainer 10 and prevent axial movement of the coil beyond a predetermined distance. Should the bearing become worn, it may be easily removed and replaced. It would be but necessary to grip the collar 15 and the end of the coil with a pair of pliers so as to torque the coil to slightly smaller diameter, and then deliver an axial thrust to the coil. This would cause the tapered surface 9 to ride over the side wall of the groove or channel 13 so that the collar 12 would thereby become detached. When this has occurred, the coil may be easily removed and replaced.

Experience has shown that a bearing liner of this type is highly efficient in use and that the liner may be easily and quickly removed and replaced.

What I claim is:

1. In combination, a supporting body having a bore formed therethrough; a tubular body of helically coiled flat spring metal, coiled to an outside diameter size larger than the bore through said body and torqued to a smaller outside diameter and inserted in said bore and retained therein through frictional contact of the periphery thereof with the surface of said bore, the ends of said coiled structure projecting beyond opposite ends of the bore; a radially projecting annular flange on each of the opposite ends of said coiled body extending radially outwardly beyond the surface of said bore; and a pair of collars each positioned in embracing relation on one of said flanges and having an annular internal channel formed therein to provide a pair of spaced apart flanges between which engage the flanges on said body.

2. In combination, a supporting body having a bore formed therethrough; a tubular body of helically coiled flat spring metal, coiled to an outside diameter size normally larger than the bore through said supporting body, and torqued to a smaller outside diameter and inserted in said bore and retained therein through frictional contact of the periphery thereof with the surface of said bore, the ends of said coiled structure projecting beyond opposite ends of said bore; a radially projecting annular flange on each of the opposite ends of said coiled body extending radially outwardly beyond the surface of said bore; and a pair of collars, there being a collar positioned in embracing relation on each of said flanges and having an internal channel to provide a pair of spaced apart flanges between which the flanges of said tubular body engage, one of said collars, at one side, having a bevelled surface for engaging the flange of said tubular body upon slipping of said collar onto said tubular body.

References Cited in the file of this patent

UNITED STATES PATENTS

| 597,797 | Burke | Jan. 25, 1898 |
| 1,606,690 | Bouton | Nov. 9, 1926 |
| 1,940,345 | Brownlee | Dec. 19, 1933 |